July 6, 1926.  R. S. BURDETTE  1,591,465
TIRE FLAP
Filed Nov. 24, 1925
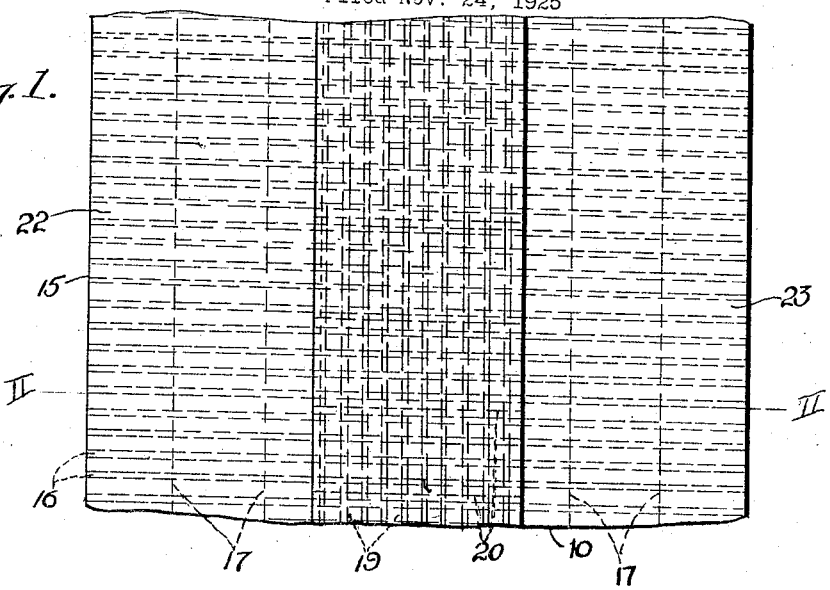
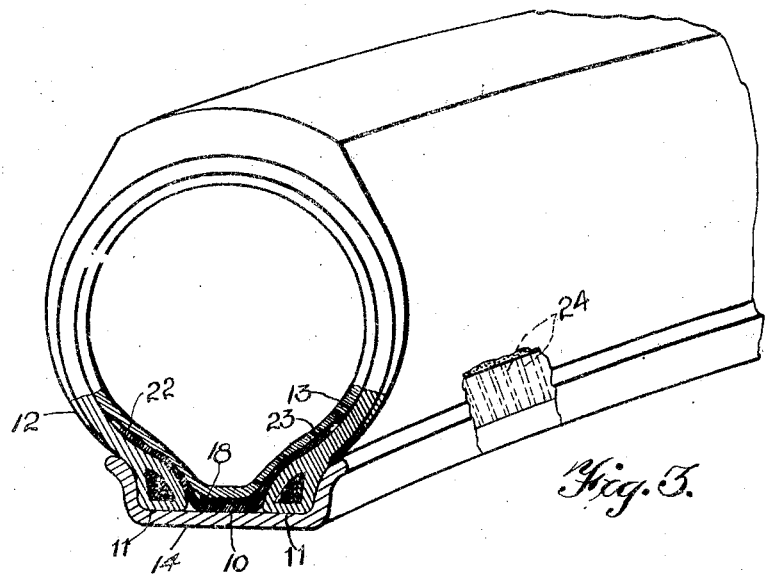
Inventor
Richard S. Burdette
By
Attorney

Patented July 6, 1926.

1,591,465

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

TIRE FLAP.

Application filed November 24, 1925. Serial No. 71,164.

My invention relates to pneumatic tires of the double tube type, and it has particular relation to members adapted for protecting the inner tube and known in the tire industry as a tire flap.

One object of my invention is to provide a flap which is adapted to be manufactured in flat strips and which will conform to the shape of those portions of the pneumatic tire casing and wheel rim which it engages when in use without being molded to conform to such shape.

Another object of my invention is to provide a flap composed of elastic material reinforced by substantially inelastic material in such manner that the edge portions of the flap are permitted to stretch while the central portion thereof is prevented from stretching.

Various types of flaps have been employed as protectors for inner tubes against the deteriorating effects of rust, which would occur if the inner tube were in direct engagement with the metal rim of the vehicle wheel, and also against pinching of the tube which is likely to occur at the bead portions of the tire casing. The most commonly known flap is composed of rubber impregnated fabric, which is cut to suitable length, dependent upon the size of the tire casing in which it is to be used. In order to construct these fabric flaps so as to conform substantially to the shape of the inner tube and tire casing in conjunction with which they are used, the flaps are so molded that they are arcuate longitudinally and are approximately arcuate or U-shape in cross-section. Even with this method of molding, there remains the likelihood of the flaps buckling or becoming wrinkled when they are inserted within a tire casing and the inner tube is inflated. Furthermore, when the flaps are prepared for shipment after manufacture, it is desirable to roll them in compact form and the rolling operation tends to flatten and destroy the U-shaped contour thereof, also the U-shape contour interferes with proper rolling of the flaps.

Solid rubber flaps have also been employed, but in order to obtain the desired strength and flexibility other difficulties present themselves. For example, relatively high grade rubber is necessary in order to render solid rubber flaps suitable for practical use. However, the high grade rubber required for this type of flaps is too expensive to justify manufacture of solid rubber flaps for all purposes. Moreover, the solid rubber flap, as a whole, is resilient to such an extent that it is likely to engage directly with the points of the beads of the tire casing, and as slight movement of the beads occurs upon the rim during operation of an automobile, the rubber flap is likely to be pinched and injured, thereby materially shortening its life.

By my invention the disadvantages which follow from the use of fabric or solid rubber flaps are obviated and certain advantageous features of both types are included in a novel flap composed of rubber and fabric. A flap constructed according to my invention consists of a relatively narrow reinforcing fabric strip secured to the central portion of the base strip. In a flap so constructed the edge portions thereof are adapted to stretch longitudinally while the central portion is restrained from stretching. This elasticity of the edges permits the flap to conform to the shape of the adjacent engaging portions of an inner tube, tire casing and wheel rim. When inserted within the tire casing, prior to inflation of the inner tube, the central portion of the flap will lie close to the peripheral surface of the wheel rim and will be held in this position by the non-extensible central reinforcement.

For a better understanding of my invention, reference may now be had to the accompanying drawings forming a part of this specification, of which:—

Fig. 1 is a fragmentary plan view of a flap constructed according to my invention;

Fig. 2 is a cross-sectional view of the flap shown in Fig. 1, the section being taken substantially along the line II—II thereof;

Fig. 3 is a perspective view partially in cross-section illustrating a pneumatic tire casing having an inflated inner tube disposed therein and provided with a flap constructed according to my invention, all mounted upon a cooperating wheel rim.

In practicing my invention I provide a flap generally indicated by the numeral 10, which is illustrated in Fig. 3 in operative position between bead portions 11 of a pneumatic tire casing 12, and engaging the inner circumferential surface of an inner tube 13. As shown in this figure, the tire casing 12 is mounted upon a wheel rim 14, which engages the central portion of the inner circumferential surface of the flap.

As best shown in Figs. 1 and 2, the flap 10 is provided with a base strip 15 of rubber compound, which is reinforced by means of transversely disposed cords 16, the latter being spaced and completely embedded within the rubber compound or they may be vulcanized to either side thereof. If desired, the cords 16 may be interwoven with spaced filler threads 17, which function only to maintain the cords in proper position before and while they are being incorporated in the rubber. These filler threads, being fragile, do not serve as strengthening elements, and may be dispensed with altogether if desired.

A longitudinally disposed relatively narrow rubberized fabric strip 18 is secured, by vulcanizing or by cementing, as may be desired, to the central portion of the rubber base strip 15. The reinforcing band 18 includes longitudinally extending cords 19, which impart strength to the flap circumferentially along its central portion. The cords 19 may be interwoven with transversely arranged filler threads 20 which are similar to and perform the same function as the filler threads 17 of the member 15. The portions 22 and 23 of the member 15, extending from the outer edges of the reinforcing strip 18 to the edges of the member 15, have no longitudinal reinforcements and are extensible longitudinally of the flap, but they are rendered non-extensible transversely thereof by means of the cords 16.

Flaps constructed according to the foregoing description are adapted to be cured in flat strips which are subsequently cut to proper lengths to accommodate various sizes of pneumatic tire casings. After being cut to length they are rolled into compact form and are then packed for shipment. Also, these flaps are adapted to be constructed in the form of endless rings, in the event that such construction is found to be desirable.

When the flap 10 is inserted within the tire casing 12, and the inner tube 13 is inflated, the rubberized fabric strip 18 will rest against the inner tube 13 and the side of the flap opposite the strip 18 will rest against the adjacent portions of the tire casing and wheel rim 14. It will be apparent that the outer extremities of the edge portions 22 and 23 in this position will be of greater circumferential length than the fabric strip 18, and these portions, being resilient, will stretch in a somewhat fan-like manner, as indicated at 24, without wrinkling, and at the same time retaining their strength by virtue of the reinforcing cords 16. The transversely arranged reinforcing cords 16 impart sufficient stiffness to the flap to prevent the toe of the beads 11 from pinching it while in use.

It is to be understood that the rubberized fabric strip 18 may include more than one layer of cord fabric, and that cross-woven fabric may be employed in this element in the event such fabric is desirable. Also, it is immaterial whether the strip 18 lies directly against the rim 14 or against the inner tube, as the flap functions efficiently in either position.

From the foregoing description it will be apparent that flaps embodying my invention are peculiarly adapted to serve the purpose of protecting inner tubes in pneumatic tire casings. They are inherently resilient in regions where resiliency and flexibility are required, as well as being strong and inextensible in regions where such characteristics are needed. Also, that their structure and flexibility renders it possible to cure the flaps by a most simple method and while in a flattened condition.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:—

1. A tire flap comprising a rubber strip provided with spaced transversely arranged cords secured therein, and a relatively narrow strip of reinforcing material secured to the rubber strip.

2. A tire flap comprising a rubber strip provided with cords vulcanized therein and disposed at right angles to the edges of the strip, and a reinforcing strip of rubberized fabric material secured to the rubber strip centrally thereof.

3. A tire flap comprising a rubber strip provided with separate spaced transversely arranged cords embedded therein and a relatively narrow strip of material provided with cords disposed longitudinally thereof secured longitudinally to the rubber strip.

4. A tire flap comprising a rubber base strip provided with spaced cords transversely embedded therein and a relatively narrow rubberized cord fabric reinforcement vulcanized to the base strip, the cords of the reinforcement being disposed substantially at right angles to the cords of the base strip.

5. A tire flap comprising a rubber strip reinforced against transverse stretching and a relatively narrow member reinforced against longitudinal stretching and so vulcanized to the rubber strip that the latter is substantially inextensible longitudinally along its central portion but adapted to stretch in a fan like manner along its edges.

In witness whereof, I have hereunto signed my name.

RICHARD S. BURDETTE.